May 3, 1966    R. M. H. CODE ETAL    3,248,853
RACING BOOTS FOR HORSES
Filed May 19, 1964    3 Sheets-Sheet 1
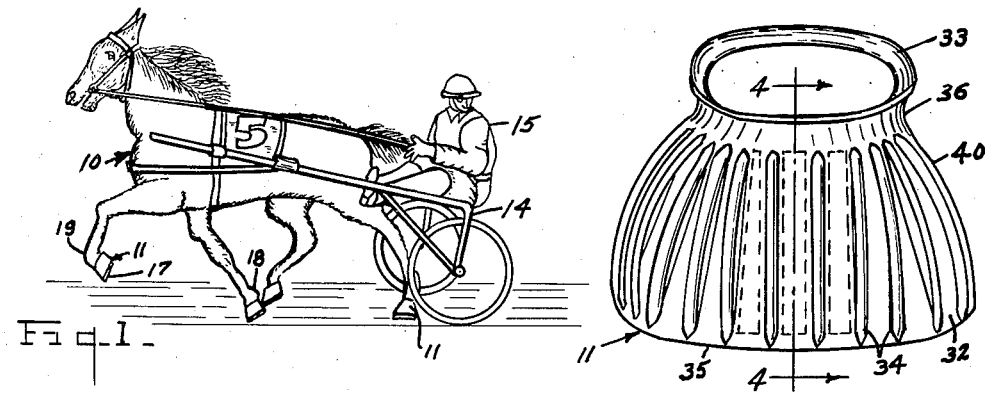
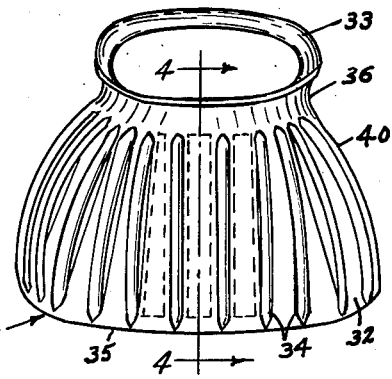
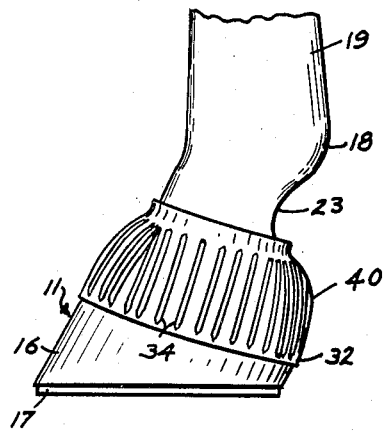
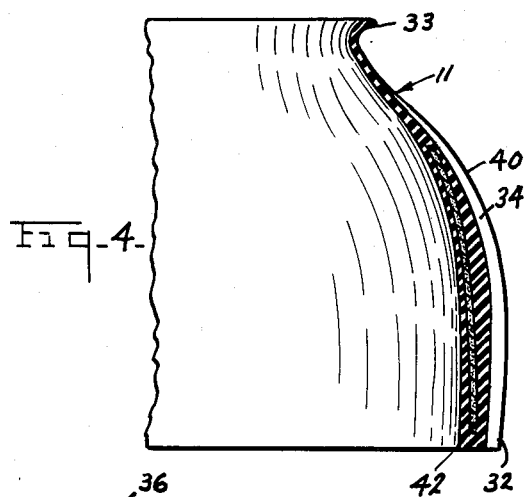
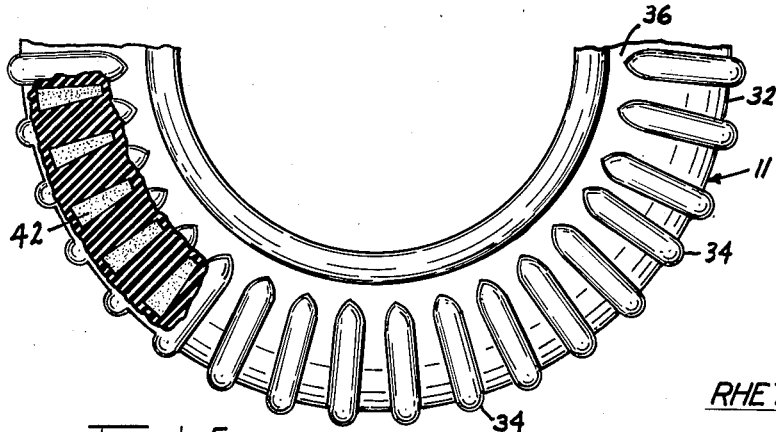
INVENTORS.
RHETA M.H. CODE.
JOSEPH B. LINDECKER.

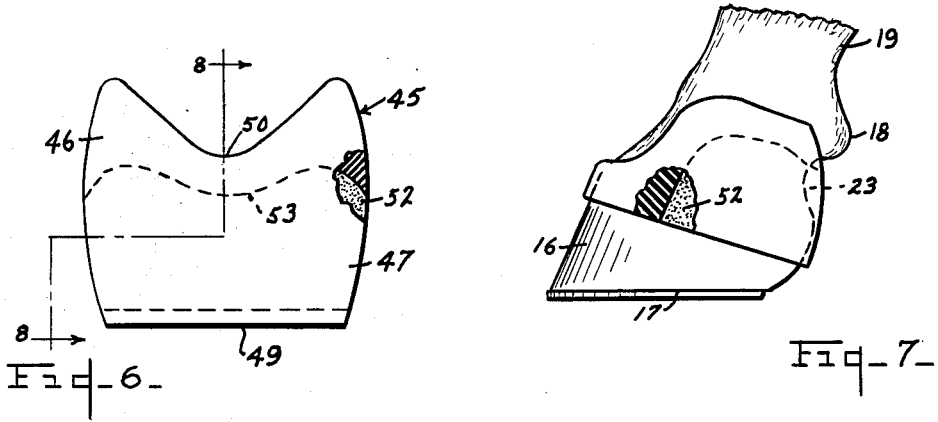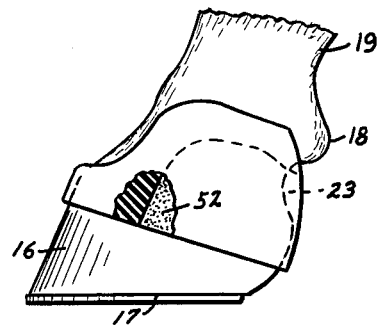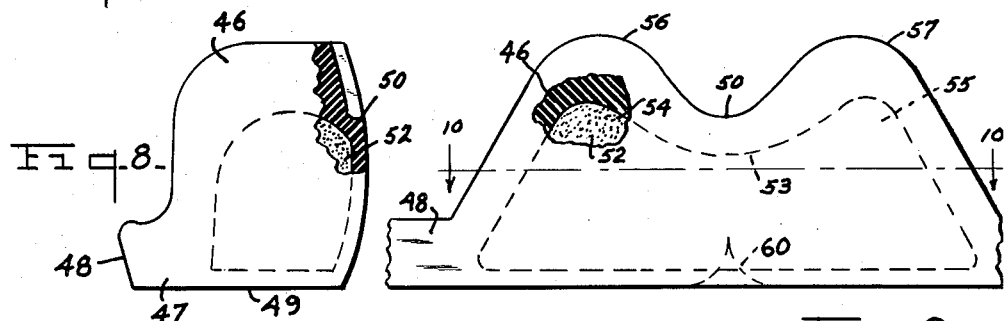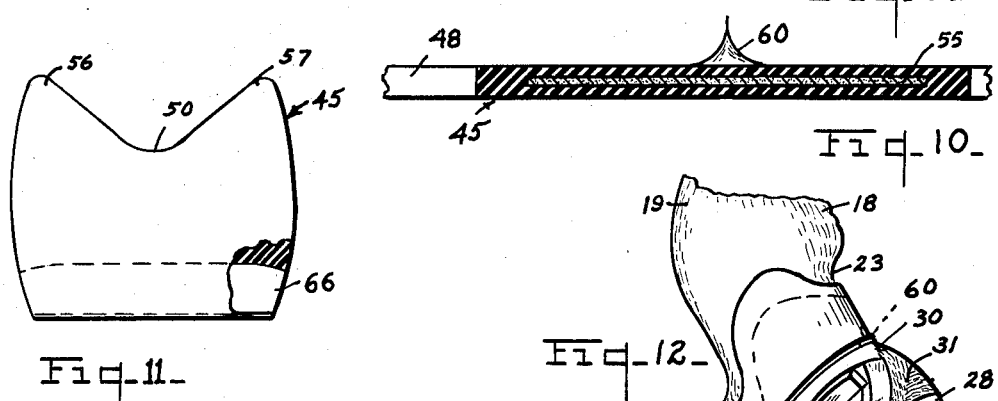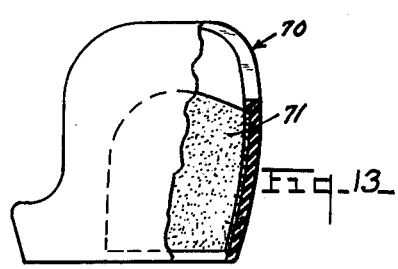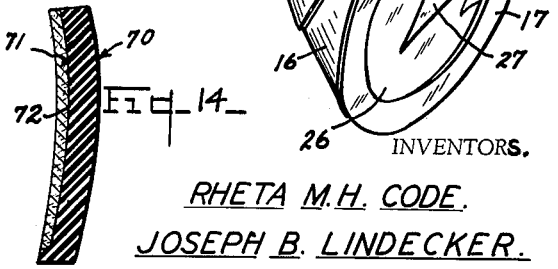

May 3, 1966 R. M. H. CODE ETAL 3,248,853
RACING BOOTS FOR HORSES
Filed May 19, 1964 3 Sheets-Sheet 3
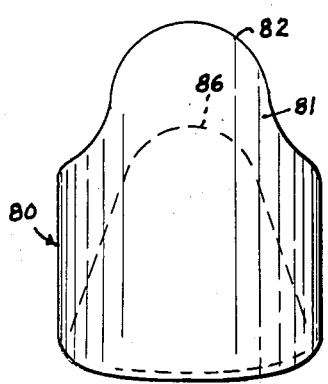
Fig-15-
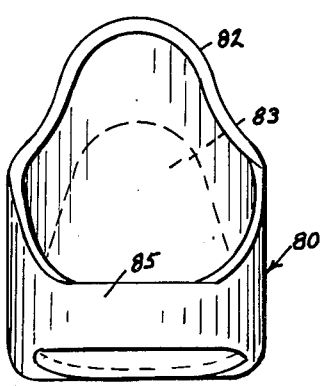
Fig-16-
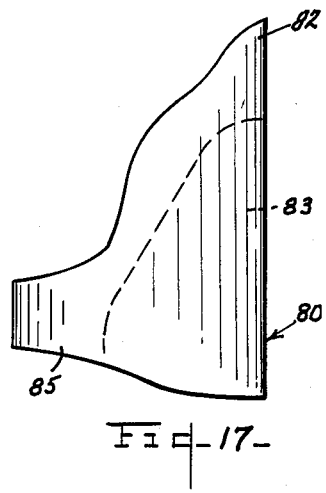
Fig-17-
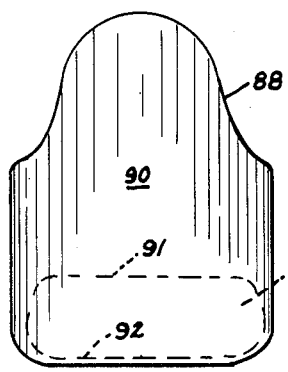
Fig-18-
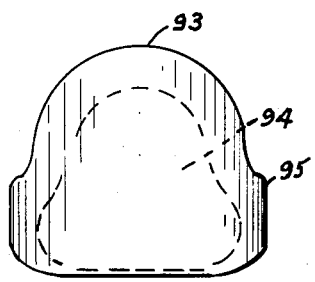
Fig-19-
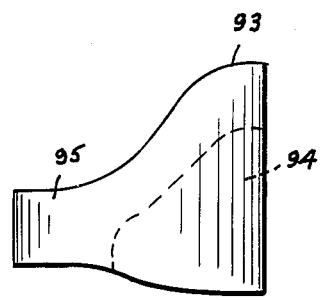
Fig-20-
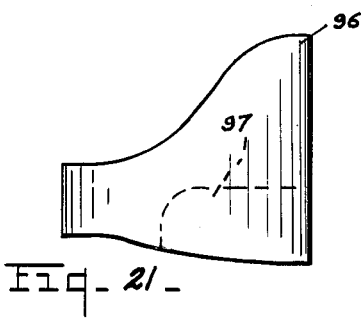
Fig-21-
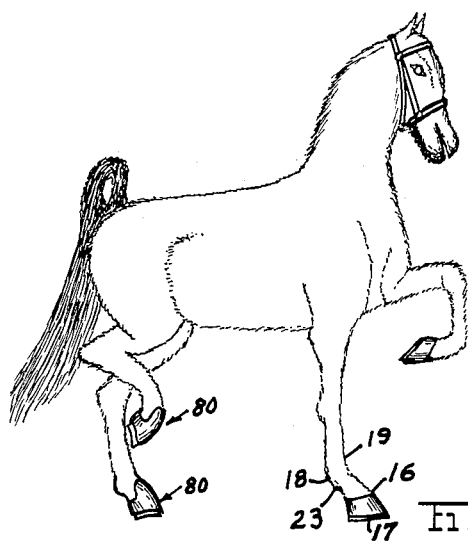
Fig-22-
INVENTORS.
RHETA M. H. CODE.
JOSEPH B. LINDECKER.

United States Patent Office

3,248,853
Patented May 3, 1966

3,248,853
RACING BOOTS FOR HORSES
Rheta M. H. Code, Box 161, Moosomin, Saskatchewan, Canada, and Joseph B. Lindecker, 8100 Keystone Ave., Skokie, Ill.
Filed May 19, 1964, Ser. No. 368,677
1 Claim. (Cl. 54—82)

This invention appertains to novel and useful improvements in protective devices for use in conjunction with racing horses' feet.

The object of our invention is to provide simple, durable, light-weight devices of inexpensive construction which may be easily and quickly applied to racing horses' feet.

A further object of our invention is to provide an improved boot, having the main body portions thereof formed of rubber embodying internal reinforcement means and to fit snugly around the feet and hoof of a racing horse with its outer surface smooth and free of obstructions.

A further object is to provide an improved bell boot for racing horses which includes novel reinforcing means embodied therein and the boot can be used on either right or left foot thereof.

A further object is to provide a quarter boot for racing horses which includes novel reinforcing means embodied therein and can be used on either front foot.

A further object is to provide a scalper-type boot made essentially of rubber and including novel reinforcing means embodied therein, or use on either hind foot of a racing horse.

A further object is to provide protective type boots for racing horses made essentially of formed rubber portions and including novel reinforcing means such as nylon embedded or embodied therein, the synthetic reinforcing means being of proteinlike structure which is adapted for fashioning into filaments of extreme toughness, strength, and elasticity.

Other objects and advantages reside in the particular structure of the invention and of the various parts thereof together with the novel combinations and sub-combinations as will be readily apparent to those skilled in the art upon reference to the attached drawing in connection with the following specification, wherein the invention is shown, described and claimed.

In the drawing:
FIGURE 1 is a side view of a racing horse in action along with a sulky and the driver, showing the bell type boot applied to each of the horse's front hoofs;
FIGURE 2 is a perspective view of the preferred form of the bell type boot of the invention;
FIGURE 3 is a side view showing the bell boot in position upon a horse's hoof;
FIGURE 4 is a fragmentary sectional view of the boot taken substantially on line 4—4 of FIG. 2;
FIGURE 5 is a fragmentary top plan view of the boot, with a part in section showing the reinforcing elements;
FIGURE 6 is a front elevation of our improved quarter boot, a part broken away to show a high reinforcing member embodied therewith;
FIGURE 7 is a side view showing the quarter boot in position on a horse's hoof, a part broken away showing the reinforcing member embodied therein;
FIGURE 8 is a side view of the quarter boot with a portion broken away showing the reinforcing member embodied therein;
FIGURE 9 is a fragmentary front view of the boot arranged in a straight vertical plane, a portion broken away.

FIGURE 10 is a sectional view of the quarter boot taken substantially on line 10—10 of FIG. 9;
FIGURE 11 is a front view of the quarter boot, similar to the boot shown in FIG. 6, a portion broken away to show a low reinforcing member;
FIGURE 12 is a perspective view of a horse's foot provided with our improved reinforcing quarter boot applied thereon;
FIGURE 13 is a side view of the quarter boot, similar to the quarter boot shown by FIG. 8, a part broken away and showing a reinforcing member secured to the central inner surface portion thereof;
FIGURE 14 is an enlarged fragmentary portion of the quarter boot shown by FIG. 13;
FIGURE 15 is a front elevation of our improved high scalper boot, the high reinforcing member shown by dotted lines;
FIGURE 16 is a rear elevation of the high scalper boot shown by FIG. 15;
FIGURE 17 is a side elevation of the high scalper boot shown by FIGURES 15 and 16;
FIGURE 18 is a front elevation of our improved high scalper boot, a low reinforcing member being shown by dotted lines;
FIGURE 19 is a front elevation of our low scalper boot with a high reinforcing member embodied therein;
FIGURE 20 is a side elevation of the low scaper boot shown by FIG. 19;
FIGURE 21 is a side elevation of the low type scalper boot with a low type reinforcing member embodied therein; and
FIGURE 22 is a side elevation of a trotter type horse with our high scalpers attached to the hoofs of the hind legs thereof.

The invention has been developed to provide an improved device for protecting racing horses' feet against injuries. Devices of this nature are well-known in the art. However, it is one of the prime purposes of this invention to provide an improved racing boot, such as a bell boot, a quarter boot and a scalper type boot with synthetic reinforcing means, or the like, increasing the wearability of the boots by use of said reinforcing means. It is most desirable to make the quarter boots and scalper boots interchangeable by embodiment of similar design, the right boot being the same as the left boot in configuration, in each type of boot.

The main function of the boots, of course, is to protect the leg areas, especially the lower leg areas, such as the fetlocks, pasterns and quarters, against injuries which might occur as a result of blows to the lower leg areas by a shod hoof of another leg, the accident of interfering in kicking, or throwing a shoe. Racing horses always wear sharp racing shoes of exactly the right weight and shape for each horse. These sharp shoes cause injury more quickly than a plain unshod hoof, and they cut the boots quicker than a plain unshod hoof.

The most common injuries requiring the protection of boots are those caused by brushing when the inside of the leg, usually on or in the region of the fetlock joints, is knocked by the opposite shod foot, or by over-reaching when the hind toes strike into the rear of the foreleg. Also the shins of either the fore or hind legs may be endangered as a result of over-reaching.

For horses such as racing horses, only our light weight reinforced boots, the bell boots, quarter boots and scalper boots, will give the very necessary protection to the lower leg region both during the long training period and when actually participating in a race without the danger of being ripped off, or ripped beyond protection during workouts, or final races.

The common bell-boot as used, also called over-reach boot, is usually made from almost pure rubber, which allows considerable elasticity and fit fairly tight, above and adjacent the hoof, is easily cut and made unfit for further use if once cut by a kick from another foot with a sharp shoe. However, our bell-boots are reinforced and only the rubber is cut by a kick and therefore are not ruined by said kick.

The greatest need for boots because of the dangerous form of over-reach which strikes the area of the fetlock joint and causes permanent damage to the tendon of the leg, is in harness racing. Gracefully gaited horses pulling delicately fashioned sulkies in close-quarters competition make a charming spectacle, but one does not always note that a horse is brushed once or twice in a race to get a good burst of speed each time, or can be whipped or run into by an unscrupulous driver of another horse, or run into by another close horse by accident, and this often causes over-reaching and resulting in permanent damage to the horse.

The trotting race is a popular form of harness racing which draws over 15 million people a year, but the trotting horse must be protected from injuries by using boots, and the like. Trotters often require bell boots on the front feet and scalpers on the hind feet because these horses lift their feet in a kitty-cornered manner and put them down almost together; they sometimes clip the left hind hoof with a sharp shoe against the right front foot when running. The bell boots and scalpers take the gaff instead of ripping the foot, the front hairline of the back foot or the back quarter of the front foot. The timing of front and rear opposite feet must be put down split seconds apart to save injury, and prevent accidents. Many things can break this natural rhythmic timing of the trotters' feet when racing, such as slipping on a slippery muddy track.

The pacer, a popular racing horse, runs with feet on same side lifted at the same time giving a swaying motion from side to side. Pacers wear quarter boots on their front feet with the wide part of the foot arranged adjacent the back of the front foot, the back quarters of the front foot needing protection from over-reaching of the hind feet. If the pacer is perfectly gaited, the hind and front feet do not interfere; however, a slight change, a muddy track, or accident causes interference, so to prevent injury the boots are used. Broken sequence of the rack, or horse's gait, often causes an accident.

Show horses and saddle horses often wear quarter boots on the front feet thereof to prevent bruises and cuts in an area which is sensitive and difficult to heal. The hooves of show horses may be surprisingly long and need a longer shoe; this shoe often interferes with their other feet, thus requiring the use of boots to prevent injuries. However, racing horses are in greater need of requiring reinforced boots since racing horses are subjected to more serious injuries.

Referring specifically to the drawing, wherein like reference characters have been used throughout the several views to designate like parts, reference is first made primarily to FIGURE 1 through 5 wherein a bell type boot is shown, 10 designates a racing horse having bell type boots 11 applied to all its hoofs, the horse being shown harnessed to a sulky 14 with a single seat for the driver 15. The horse's hoof 16, as shown by FIG. 12, has a shoe 17 applied thereto. The fetlock 18 and ankle 19 are shown above the hoof in FIGURES 1, 3, 7, 12 and 22, and the pastern 23 is shown below the fetlock 18. See FIGURES 3, 7 and 12. The hoof shows the sole 26, the frog 27, the buttresses 28, and bars 29, see FIG. 12. The hoof includes the usual bulbs 30 located below the bulbs 30 at intermediate the bulbs 30 at the back of the hoof there is provided a groove 31 which runs into the frog 27.

The bell boot 11 according to our invention comprises an upper section, or bell, generally designated by 32 with a rolled upper free edge 33 to protect the horse's ankle from chafing, is all made of pure rubber, which allows considerable elasticity. Vertical ribs 34 are located around the exterior surface of bell 32 so that a reinforcing effect is distributed around the whole upper surface of the globular body, or bell 32; the ribs 34 are integral with the body portion and extend from the lower peripheral edge 35 about the large lower opening and upwardly past the equator 40 of the shell and substantially to the neck portion 36 below the upper free edge 33. The ribs 34 being of solid rubber, integral with the bell, are of larger cross-sectional area at the equator of the shell than at their ends. The number of ribs depend upon the size of the bell boot 11 and the uniform spacing of the ribs, but all ribs in any shell are usually of approximately the same length. The shell and ribs being of soft, elastic rubber, are subject to destruction if struck by a sharp shoe of a race horse. The ribs render substantial reinforcement; however, they do not prevent a cut, or a break, to extend from the exterior to the interior of the shell of a common type bell boot. This improved bell boot 11 has additional reinforcing members 42 arranged in the shell of the boot and between the vertical ribs thereof; see FIGURES 4 and 5. Since the ribs are closer together adjacent the neck of the shell, the spaces between the ribs are likewise reduced at the upper portions thereof. The reinforcing members 42 are fibre units which permits all of the attached fibers to be thoroughly embedded in the latex body of the shell itself; the fibers are generally synthetic fibers such as rayon, and allow the fibres to be individually movable apart from each other when the latex shell is stretched, said fibers being located solely in the body of the latex material, each unit having the shape of a trapezoid and capable of stretching in a horizontal direction when the shell is stretched when applied over the hoof of a horse. The fibre reinforcing units 42 reinforce the thin areas of the shell while the ribs 34 reinforce the areas between the fibre units 42. The boots protect the leg areas such as the fetlocks, pasterns and quarters against injuries resulting from blows of another leg with hoof and a sharp shoe. However, one blow generally ruins the ordinary boot while the reinforcing units between the vertical ribs arranged on our improved boot will increase the wearability of the boot and prevent the boot from being ripped beyond usefulness.

Referring specifically to FIGURES 6 through 12, wherein a quarter type boot is shown, 45 designates a simple, durable, inexpensive quarter type boot of longer wearability. The quarter boot is most generally used on race horses especially on the front feet of a pacer to protect the "quarters" of the front feet. You realize on the pacer, where the two feet on one side move ahead at the same time, then, the hind foot on the opposite side can strike the quarters of the front foot, if the horse is not well gaited. Also, with a trotter type horse it is the hind foot of the same side which can strike the quarter of the front foot. The boot 45 has a top body portion 46 and a reinforced lower body portion 47 integral with each other, the body portions being molded from pure rubber which allows considerable elasticity, so as to fit properly around the hoof and the fetlock of the race horse. A rubber strap 48 is integrally connected with the opposite edge portions of the lower body portion 47, forming a substantially circular lower peripheral edge 49 for the quarter boot. The top edge of the upper body portion 46 is also curved inwardly at its central portion 50. The lower body portion 47 is provided with a fiber type reinforcing member such as rayon member 52, said rayon member being of substantially the same shape as the entire body of the quarter boot only smaller, leaving the rubber edges of the boot free of any reinforcement, allowing more elasticity therein. The rayon member 52 is also curved inwardly at its central portion 53 to form wing portions 54 and 55 arranged below the wing portions 56 and 57 of the upper body portion 46. The wing portions 56 and 57 of our improved reinforced quarter boot are of the same vertical height and useable on either the right or left foot of a horse. The common quarter boot now in use has wing portions of unequal vertical height and should a horse constantly kick the same hoof, say the left hoof and cuts the boot, then both boots must be discarded as the right boot cannot be used on the left hoof. It is obvious that boots which can be used on either hoof are a money saving device, especially where they are reinforced as by this invention. The rayon reinforcing member has a straight lower edge portion, upwardly and inwardly end edge portions and a top edged portion curved inwardly at its central portion 53, clearly shown by FIG. 9. The inside lower edge portion of the quarter boot is provided with a wedgelike solid rubber lug 60 to fit into the groove 31 or depression in the hoof when the boot is applied to the foot and hoof, the said lug providing means for centering the boot as it is applied and for preventing the slipping of the boot in either direction. The integral strap 48 is arranged around the front of the foot, and being of resilient rubber may be easily and quickly applied to boot and hoof, and when so applied is securely held in position.

Referring to FIGURE 11, a quarter boot 45 is shown with a low reinforcing member 66 embedded therein, the low member 66 being similar to member 52 except it is lower in vertical height and does not have an inwardly curved portion in its upper edge portion; in fact it has a straight bottom edge, upwardly and inwardly end edge portions and a substantially horizontal top edge portion, substantially a trapezoid configuration. Low reinforcing members 66 provide a quarter boot much lighter than the high reinforcement boots and are used wherever high reinforcement boots are needed.

Referring to FIGURES 13 and 14, a quarter boot 70 is shown similar to boot 45; however, the reinforcing member 71 is not molded between the front and rear side walls of the boot. The reinforcing member 71 is substantially the same shape and thickness as member 52 shown in FIGURES 8 and 9. The synthetic fibers such as rayon are used in providing member 71. The rubber latex boot is generally manufactured by using a mold, the boot having a recessed inside chamber 72. The synthetic fibers are usually blown through nozzles at a pressure of 30 lb./sq. in. against the wet surface of chamber 72 to cause the particles to become suitably embedded therein. When the maximum numbers of fibers have been embedded into the wet latex, the new boot is placed in a drying room until all moisture is removed from the latex, and it is cured.

The quarter boot with reinforcement 71 is wearable over a longer period of time and has unexpected advantages. The movement of the flesh or hoof on the lining of fibers causes the member 71 to "breathe" and to expel the moisture evaporating from the foot and the heat from the flesh. It is cooler to wear in summer, during racing season as well as the training season. The dense reinforcing member 71 forms a lining of short fibers individually movable apart from each other when the latex portion of the boot is stretched, said fibers being located solely in the surface of said latex material forming chamber 72.

Referring to FIGURES 15 through 21, the scalper type boot is shown with high and low reinforcing members embedded within the body wall thereof. The usual scalpers now in use have a front body portion with one side area thereof smaller than the other side area; one fits the hind left foot and the other the hind right foot. They are not interchangeable and one must buy a pair if only one boot is ripped or cut by a sharp shoe. Our invention relates to a reinforced scalper which is interchangeable. The scalper shown by FIGURES 15 through 17 relates to a high scalper 80 with a front wall 81 with high wing portion 82 with a reinforcing member 83 molded within the front wall 81, and having a strap member 85 integrally connected to the opposite side edges of wall 81. The reinforcing member 83 has a curved top edge 86 which extends upwardly and embedded in the high wing portion 22 and is composed of rayon fibers as described above, giving longer wear to the boot and preventing rips or cuts to extend through the front wall and destroying the same.

The scalper type boot 88 shown by FIGURE 18 is a high latex boot with a low reinforcing member 89 molded with the front and rear surfaces of the front wall 90, said reinforcing member 89 having parallel top and bottom horizontal edge portions 91 and 92.

The scalper 93 shown by FIGURES 19 and 20 are known as low type scalpers with relatively high reinforcing member 94 and integral strap member 95.

The scalper 96 shown by FIGURE 21 is known as a low scalper with a low reinforcing member 97 embodied within the front wall thereof, said member 97 having a straight horizontal top edge portion substantially parallel with the bottom edge portion thereof.

Referring to FIGURE 22, a horse is shown with high scalpers 80 applied to the hind feet thereof.

Although we have described our invention with a certain degree of particularity, it is understood that the present disclosure has been made only by way of example, and that changes in details of construction and the combination and arrangement of parts may be resorted to without departing from the spirit and scope of the invention here presented.

Having thus described this invention, what we claim as new and desire to secure by Letters Patent of the United States is:

A protective quarter boot for the front foot of a horse, comprising an integrally moulded substantially tubular element of impact resistant elastic material adapted to grip the exterior of the hoof elastically and grip the foot elastically in the coronary region directly above the hoof, said boot having a straight lower edge portion and a curved upper edge portion, said boot having two side walls, a rear wall and a strap type front wall, said side and rear walls having a dense reinforcing member embedded solely therein and being smaller and substantially the same combined shape thereof and thereby leaving the elastic edges of the boot and the front wall thereof free of any reinforcement, said reinforcing member consisting of a dense lining of short rayon fibers individually movable apart from each other when the rubber central body portion is stretched, the walls at the sides of the boot being of equal height and higher than the rear wall and convexed outwardly like a barrel, the upper portions of the said side walls being convex, the rear wall being higher than the front wall and convexed outwardly like a barrel, the rear wall having a concave upper edge portion joined with the adjacent curved convex upper edge portions of said side walls, said front wall having a top edge portion substantially parallel to its lower edge portion, and the edge portions of said side walls adjacent said front wall extending downwardly and angularly outwardly forming an obtuse angle at their junction with the top edge of said front wall, the boots being interchangeable and useable on either front foot of a horse whereby the boots may be purchased in quantity and not pairs.

References Cited by the Examiner

UNITED STATES PATENTS

| | | | |
|---|---|---|---|
| 482,041 | 9/1892 | Hurd | 54—82 |
| 3,119,219 | 1/1964 | Cohen | 54—82 |

SAMUEL KOREN, *Primary Examiner.*

HUGH R. CHAMBLEE, MELVIN D. REIN, *Examiners.*